(12) United States Patent
Campazzi et al.

(10) Patent No.: US 9,926,453 B2
(45) Date of Patent: Mar. 27, 2018

(54) MULTIFUNCTIONAL COATING FOR AIRCRAFT

(75) Inventors: Elisa Campazzi, Boulogne Billancourt (FR); Jocelyne Galy, Villeurbanne (FR); Franck Gaudin, Lyons (FR); Jean-François Gerard, Bron (FR); Martine Villatte, Rueil Malmaison (FR)

(73) Assignees: AIRBUS, Blagnac (FR); INSTITUT NATIONAL DES SCIENCES APPLIQUEES DE LYON, Villeurbanne (FR)

( * ) Notice: Subject to any disclaimer, the term of this patent is extended or adjusted under 35 U.S.C. 154(b) by 0 days.

(21) Appl. No.: 13/518,764

(22) PCT Filed: Dec. 22, 2010

(86) PCT No.: PCT/FR2010/000868
§ 371 (c)(1),
(2), (4) Date: Oct. 26, 2012

(87) PCT Pub. No.: WO2011/086248
PCT Pub. Date: Jul. 21, 2011

(65) Prior Publication Data
US 2013/0101800 A1 Apr. 25, 2013

(30) Foreign Application Priority Data
Dec. 23, 2009 (FR) ..................... 09 59445

(51) Int. Cl.
*B05D 3/12* (2006.01)
*C09D 5/00* (2006.01)
(Continued)

(52) U.S. Cl.
CPC ............ *C09D 5/00* (2013.01); *C08F 290/067* (2013.01); *C08G 18/672* (2013.01);
(Continued)

(58) Field of Classification Search
CPC ........ C08F 2/48; C08F 290/067; C08G 18/40; C08G 18/672; C08G 77/045; C08G 77/20;
(Continued)

(56) References Cited

U.S. PATENT DOCUMENTS 4,281,194 A * 7/1981 Armor et al. ............... 564/267
5,035,934 A 7/1991 Tomiyama et al.
(Continued)

FOREIGN PATENT DOCUMENTS

EP 0 959 102 A2 11/1999
WO WO 90/05752 A1 5/1990
WO WO 2008071245 A1 * 6/2008

OTHER PUBLICATIONS

Hawley's Condensed Chemical Dictionary, thirteenth edition, p. 820.*

*Primary Examiner* — Robert S Walters, Jr.
(74) *Attorney, Agent, or Firm* — Im IP Law; C. Andrew Im

(57) ABSTRACT

A method for coating a surface comprises applying a layer of coating composition onto the surface, mechanically forming parallel ribs on the layer, and simultaneously polymerizing the layer with ultraviolet radiations. The coating composition comprises a mass percentage of urethan-acrylate oligomer, with an average molar mass in number between 1000 and 5000 g·mol$^{-1}$, between 35% and 75%. The coating composition further comprises a mass percentage of a diluting agent, copolymerizable with urethan-acrylate oligomers, between 15% and 60%, and a mass percentage of pyrogenic silica between 0.5% and 5%.

9 Claims, 4 Drawing Sheets

(51) Int. Cl.
*C08F 290/06* (2006.01)
*C08G 18/67* (2006.01)
*C08G 77/04* (2006.01)
*C08G 77/20* (2006.01)
*C08G 77/24* (2006.01)
*C09D 7/12* (2006.01)
*C09D 175/16* (2006.01)
*C08K 3/36* (2006.01)
*C08K 9/06* (2006.01)

(52) U.S. Cl.
CPC .......... *C08G 77/045* (2013.01); *C08G 77/20* (2013.01); *C08G 77/24* (2013.01); *C09D 7/1225* (2013.01); *C09D 175/16* (2013.01); *C08K 3/36* (2013.01); *C08K 9/06* (2013.01); *Y10T 428/2457* (2015.01)

(58) Field of Classification Search
CPC ........ C08G 77/24; C09D 5/00; C09D 7/1225; C09D 175/16; C08K 3/36; C08K 9/06; B29C 37/0053; B29C 59/02; B29C 2043/023; B29C 2043/025; B29C 2059/023; Y10T 428/2457
USPC ................. 427/508, 510, 515, 517
See application file for complete search history.

(56) References Cited

U.S. PATENT DOCUMENTS

| | | | |
|---|---|---|---|
| 6,040,357 A * | 3/2000 | Murphy et al. | 523/160 |
| 7,401,552 B2 * | 7/2008 | Daems et al. | 101/401 |
| 7,425,586 B2 * | 9/2008 | Weine Ramsey | 522/74 |
| 7,544,411 B2 | 6/2009 | Baumann et al. | |
| 2003/0164575 A1 * | 9/2003 | Solomon et al. | 264/171.13 |
| 2004/0035498 A1 * | 2/2004 | Kinlen | C08F 2/46 148/250 |
| 2004/0225039 A1 * | 11/2004 | Hackbarth et al. | 524/115 |
| 2005/0148739 A1 | 7/2005 | Hara et al. | |
| 2006/0137555 A1 * | 6/2006 | Simon | B82Y 10/00 101/483 |
| 2006/0204681 A1 * | 9/2006 | Kim | C09K 19/2007 428/1.31 |
| 2006/0216476 A1 * | 9/2006 | Ganti et al. | 428/143 |
| 2007/0237925 A1 * | 10/2007 | Castle et al. | 428/141 |
| 2007/0257400 A1 * | 11/2007 | Stenzel et al. | 264/293 |
| 2009/0211480 A1 * | 8/2009 | Castillo et al. | 101/493 |
| 2011/0068512 A1 * | 3/2011 | DeCato et al. | 264/478 |
| 2012/0076910 A1 * | 3/2012 | Moreira de Almeida et al. | 426/551 |

* cited by examiner

| Composition | 1 | 2 | 3 | 4 |
|---|---|---|---|---|
| Contact angle (°) | 80 | 70 | 73 | 70 |

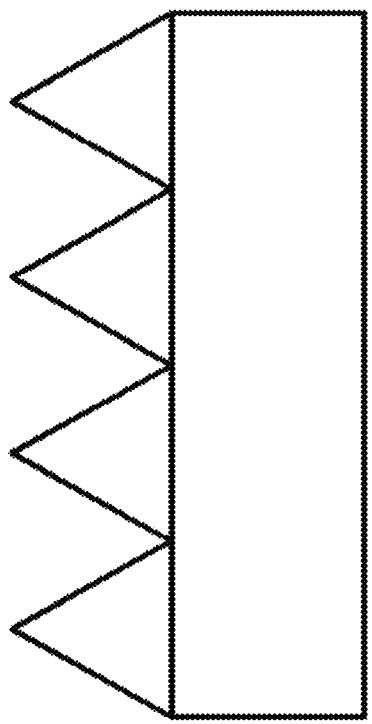

MULTIFUNCTIONAL COATING FOR AIRCRAFT

RELATED APPLICATIONS

This application is a § 371 application from PCT/FR2010/000868 filed Dec. 22, 2010, which claims priority from French Patent Application No. 09 59445 filed Dec. 23, 2009, each of which is incorporated herein by reference in its entirety.

TECHNICAL FILED OF THE INVENTION

The present invention refers to a surface coating, in particular for aircrafts. The invention also refers to a composition making it possible to obtain this coating, as well as a method for forming this coating.

BACKGROUND OF THE INVENTION

The functions of a coating system for civil aircrafts are in particular the mechanical and chemical protection of the cell. Indeed, the external surface of planes is intended to be subjected to air frictions and to be exposed to ultraviolet rays, as well as to a corrosive (water, salts . . . ) and eroding (sand, rain . . . ) environment.

Moreover, this external surface is likely to be soiled, in particular due to collisions with insects. This type of pollution can generate a considerable disturbance of the aerodynamic behavior.

In addition, the presence of water or ice on the external surface of a plane can disturb several flight parameters, as for example lift, drag and/or thrust. It is thus preferable to use anti-icing and hydrophobic coatings.

Lastly, in order to decrease the power consumption of a plane, it is interesting to reduce air frictions on the cell, in particular friction drag.

Solutions to these problems are known. It is in particular common, in the state of the art, to use multi-layer coatings. Each layer fulfills a function of protection of the external surface of the plane.

OBJECT AND SUMMARY OF THE INVENTION

The object of the present invention is however a coating with several functions in only one layer.

A main object of the invention is a coating able to provide surfaces which are both self-cleaning and anti-icing.

When designing self-cleaning surfaces, it is known to try to reproduce the "Lotus effect": a water droplet deposited on a lotus leaf tends to keep its spherical shape, because of the surface properties of said leaf. Water streams while carrying along all the dirt particles deposited on the lotus leaf, which thus remains perfectly clean.

The properties of a lotus leaf, called superhydrophobicity, are related to the chemically hydrophobic nature of its surface, as well as to nanorugosity. A lotus leaf indeed has asperities of nanometric size. When a water drop is deposited onto the leaf, air pockets are then formed between the drop and irregularities on the surface. The drop thus tends to keep its spherical shape.

Self-cleaning surfaces reproducing the Lotus effect are described for example in U.S. Pat. No. 7,544,411.

The anti-icing properties of surface coatings are often due to the chemically hydrophobic nature of said surfaces. It is in particular well-known to use fluorinated polymers, such as in U.S. Pat. No. 5,035,934. On the other hand, the roughness of a surface contributes to the nucleation of ice crystals, therefore the appearance of ice.

In order to obtain a surface coating for aircrafts combining self-cleaning and anti-icing properties, it is thus advisable to determine an optimal level of roughness.

Moreover, the coating must have a certain resistance to erosion, so that said roughness is sufficiently stable over time.

The present invention makes it possible to obtain a coating whose surface properties induce self-cleaning and anti-icing effects, as well as a satisfactory resistance to erosion. An object of this invention refers to a coating composition with: a mass percentage of urethane-acrylate oligomers between 35% and 75%; a mass percentage of a diluting agent, copolymerizable with urethane-acrylate oligomers, between 15% and 60%; a mass percentage of hydrophobic pyrogenic silica between 0.5% and 5%.

By "urethane-acrylate oligomer", one understands an oligomer including a block polyurethane, linear or ramified, comprising acrylate groups at chain terminals and/or in a side position of a main chain.

By "block polyurethane", one understands a macromolecule having urethan functions.

By "hydrophobic pyrogenic silica", one understands a pyrogenic silica after a treatment for increasing the hydrophobicity of its surface.

According to a preferential embodiment of the invention, hydrophobic pyrogenic silica is provided with a polydimethylsiloxy- or dimethylsiloxy-function, with a percentage of residual hydroxyl functions inferior or equal to 50%.

According to a preferential embodiment of the invention, the composition moreover comprises a mass percentage of at least one fluorinated compound, copolymerizable with urethane-acrylate oligomers, between 0.5% and 5%. This type of fluorinated compound makes it possible to increase the hydrophobicity of the coating.

According to a preferential embodiment of the invention, the fluorinated compound copolymerizable with urethane-acrylate oligomers has one or more acrylate or methacrylate functions.

Another object of this invention is a method for coating an aircraft, comprising the following steps: applying to a prepared surface a layer with a composition such as described above, then polymerizing said layer. For the step of polymerization, the urethane-acrylate matrix makes it possible to choose between a heat treatment and a treatment with ultraviolet rays. In the case of a treatment with ultraviolet rays, a photo-catalyst for polymerizing acrylates is added to the composition. In the case of a heat treatment, one can also add a triggering agent to the composition.

According to a preferential embodiment of the invention, the method for coating comprises a mechanical step of forming raised patterns on the composition layer. The purpose of such raised patterns is to reduce the friction drag caused by fluids flowing in contact with the coating. A coating with similar raised patterns is described in particular in patent EP1578600.

According to said preferential embodiment of the invention, a composition layer such as previously described is applied onto a prepared surface, said composition comprising a photo-catalyst; then parallel ribs are mechanically formed on the composition layer and said layer is simultaneously polymerized with ultraviolet rays.

According to another preferential embodiment of the invention, ribs are formed directly during the step of applying the composition layer onto the surface, by depositing different quantities of composition according to the zone concerned of said surface.

An object of the invention is also coating a aircraft surface, through a method such as described above.

In addition to coatings to be applied in a liquid state onto aircraft structures, the invention makes it possible to make self-supported adhesive layers, or adhesive films, able to be placed in a solid state. Another object of the invention is thus a film for coating aircrafts, comprising an external layer, formed by a method such as previously described, as well as an adhesive layer, intended to come into contact with a aircraft structure.

BRIEF DESCRIPTION OF THE DRAWINGS

The invention will be better understood when reading the following description and examining the annexed figures given as an indication and by no means a restriction of the invention. The figures show:

FIG. 6: a schematic view of a comb-shaped tool according to an embodiment of the invention.

DETAILED DESCRIPTION OF THE EMBODIMENTS

Figure 1:
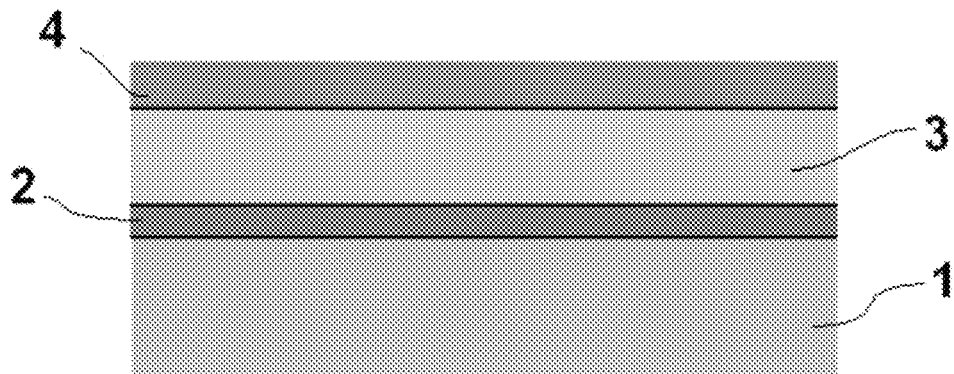
FIG. 1: a schematic sectional view of a coating for aircraft according to a first embodiment of the invention.

FIG. 1 represents a sectional view of a coating for aircraft. One distinguishes a metal substrate 1, which is a part of an aircraft structure. For example, the substrate 1 consists of an aluminum alloy.

The substrate 1 is covered with a first coating layer 2. This first layer 2 can in particular be an anodization layer or a conversion coating. In the state of the art, this first layer 2 is generally formulated by means of a mineral matrix. It provides a protection against corrosion and improves adherence between the metal substrate 1 and one or more other coating layers.

The first coating layer 2 is covered with an intermediate layer, also called primary layer 3. The primary layer 3 typically comprises a pigmented organic resin matrix. The primary layer 3 is usually the main provider of a protection against the corrosion of the aircraft structure.

In the state of the art, the primary layer is covered with a finishing layer 4, which has the role of a main barrier against environmental influences and which provides the aircraft with a decoration and a covering-up. In the state of the art, the finishing layer is typically formulated by means of a polyurethane/polyol resin.

An object of the present invention is to provide a coating intended to replace the finishing layer 4. The matrix of the coating according to the invention must thus be compatible with the primary layer 3. This compatibility is reached by the urethane-acrylate matrix used in the present invention.

The urethane-acrylate matrix also has a good resistance to environmental aggressions, in particular to UV radiations.

Figure 2:
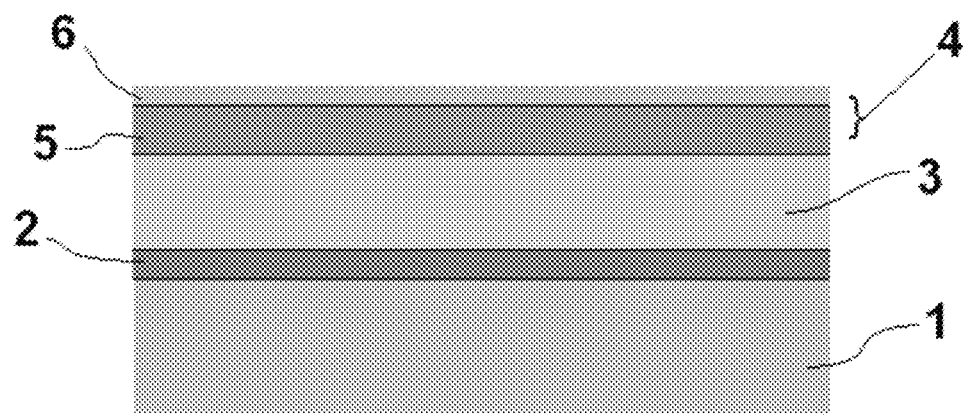
FIG. 2: a schematic sectional view of a coating for aircraft according to a second embodiment of the invention.

FIG. 2 represents a sectional view of a coating for aircraft according to another embodiment of the invention. Indeed, in certain cases, the finishing layer 4 comprises two underlayers: a basic underlayer 5 and a surface underlayer 6. Another object of the present invention is to provide a coating intended to replace the surface underlayer 6. The urethane-acrylate matrix offers a good compatibility with the majority of known basic underlayers 5 in the state of the art.

In a more general way, the urethane-acrylate matrix is compatible with many types of coatings. Said coatings can comprise an organic matrix, or an organic/mineral hybrid matrix such as the coatings resulting from a sol-gel process.

The urethane-acrylate matrix can also have a good adherence to coatings with a mineral matrix. It is thus possible to use a coating according to the invention for replacing a primary layer 3.

Generally, the urethane-acrylate oligomers according to the invention comprise a block polyurethane, linear or ramified, comprising acrylate groups at chain terminals or in side positions of a chain. By "block polyurethane", one understands a macromolecule comprising urethane or —NH—CO—O— functions. Preferentially, the block polyurethane is aliphatic, i.e. without any aromatic group.

An example of polyurethane-acrylate oligomer according to the invention corresponds to the formula (I) below:

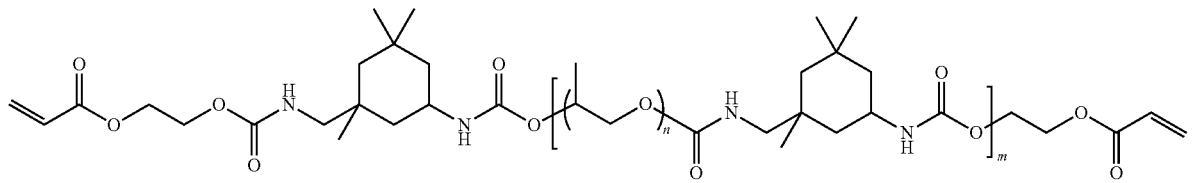

(I)

According to an embodiment of the invention, the block polyurethane is a urethane-siloxane copolymer. More precisely, the block polyurethane comprises polydialkylsiloxane, for example polydimethylsiloxane, patterns. The use of polyurethane-polydimethylsiloxane blocks makes it possible to increase the hydrophobicity of the surface of the coating.

According to a preferential embodiment of the invention, the average molar mass in a number of urethane-acrylate oligomers is comprised between 1000 and 5000 g·mol$^{-1}$ in order to obtain a satisfactory viscosity of the composition. Resins appropriate for making compositions according to the invention are in particular marketed under the trademark Ebecryl® (Cytec).

According to a preferential embodiment of the invention, the diluting agent copolymerisable with urethane-acrylate oligomers has one or more acrylate or methacrylate functions. It is for example tripropylene glycol diacrylate or 1,6-hexanediol diacrylate.

The compositions according to the invention has a mass percentage of pyrogenic silica, after a treatment for increasing the hydrophobicity of its surface, comprised between 0.5 and 5%. Typically, pyrogenic silicas are made hydrophobic by a treatment containing silanes or polysilanes, in order to decrease the number of free hydroxyl functions on their surface. Preferentially, the residual percentage of hydroxyls is lower than or equal to 50%. More preferentially, it is lower than or equal to 25%.

According to a preferential embodiment of the invention, a pyrogenic silica has a specific surface comprised between 80 and 200 $m^2 \cdot g^{-1}$. This specific surface is appropriate to the production of hydrophobic surfaces.

Pyrogenic silicas appropriate to compositions according to the invention are in particular marketed under the trademark HDK® (Wacker).

According to a preferential embodiment of the invention, the compositions moreover comprises at least one fluorinated compound copolymerizable with urethane-acrylate oligomers. When integrated into a polymeric coating, fluorinated compounds make it possible to chemically improve the hydrophobicity of the formed surfaces by decreasing the surface energy.

Preferentially, said fluorinated compounds have one or more acrylate or methacrylate functions. It can be a molecule of hydrofluorocarbon type, linear or ramified, with a acrylate or methacrylate group. For example, the fluorinated compound corresponds to the formula (II) below:

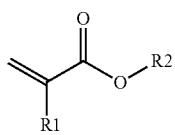

(II)

in which R1=—H or —CH$_3$ and R2 is a fluorinated or perfluorinated alkyl, comprising from 3 to 12 atoms of carbon. Particular compounds are mentioned in the embodiment examples of compositions according to the invention.

According to another preferential embodiment of the invention, the compositions moreover comprise at least one Polyhedral Oligomeric Silsesquioxane or POSS, with at least one function copolymerizable with urethane-acrylate oligomers. Preferentially, said copolymerizable function is an acrylate or methacrylate function.

POSS have a three-dimensional structure which makes it possible to provide the coating surface with a roughness, on a scale lower than that of the roughness provided by pyrogenic silica. This roughness contributes to the Lotus effect on the coating surface.

More preferentially, the POSS comprises at least one fluorinated group. An example of suitable compound is represented below (formula (III)):

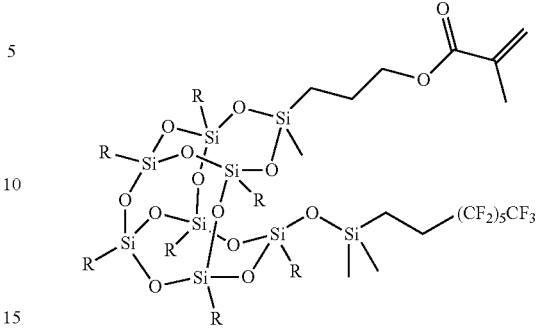

(III)

wherein R represents a linear or ramified alkyl group, comprising from 1 to 8 atoms of carbon. For example, R represents cyclopentyl.

In embodiments implying a polymerization of the composition with ultraviolet rays, this composition must contain a photo-catalyst for polymerizing acrylates, such as for example 1-hydroxy-cyclohexyl-phenylketone. This compound is marketed in particular under the trademark Irgacure® 184 (Ciba).

A method for forming a coating such as represented in FIGS. 1 and 2 can be as follows: first of all, the surface for receiving a coating is prepared. In the embodiments represented in FIGS. 1 and 2, said surface is formed respectively by the primary layer 3 and the basic underlayer 5. A suitable preparation of said surface can consist in a solvent washing activation, or in a mechanical activation, or any other known type of preparation of the state of the art.

Then, a layer 4 or 6 of a composition according to the invention, in a liquid state, is deposited onto the layer 3 or 5. The deposition can be carried out for example by means of a bar coater. Other known methods of deposition, such as spraying, can be used.

Preferentially, the layer 4 or 6 of the composition has a thickness comprised between 5 and 300 µm, more preferentially between 20 and 150 µm.

Lastly, the layer 4 or 6 is subjected to a polymerization treatment. It can be a heat treatment, or a treatment with ultraviolet rays. In order to be able to use a treatment with ultraviolet rays, it is necessary that the composition forming the layer 4 or 6 contains a photo-catalyst for polymerizing acrylates.

Figure 3:
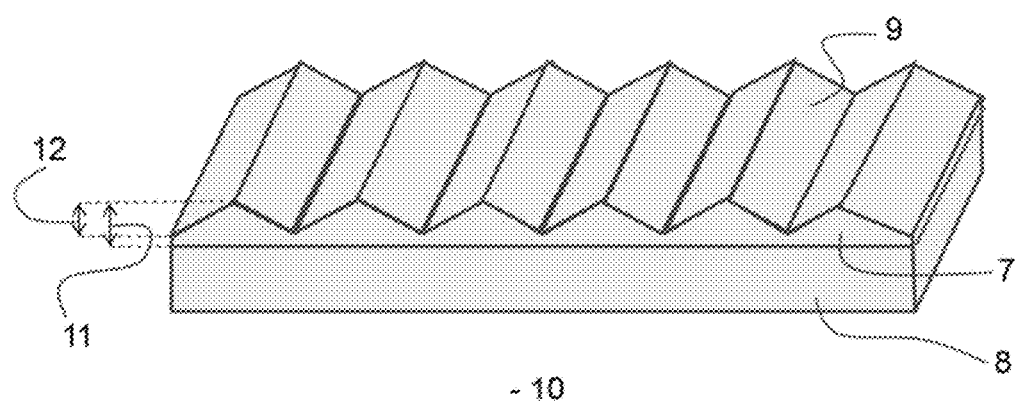
FIG. 3: a schematic sectional view of a coating for aircraft according to a third embodiment of the invention.

FIG. 3 represents a sectional view of a coating 10 for aircraft, according to another embodiment of the invention. The surface of said coating 10 is formed by a layer 7 from a composition according to the invention. The layer 7 is in contact with an underlayer 8, for example a primary layer.

The surface layer 7 comprises raised patterns, more particularly of ribs 9. These ribs 9 are for example formed mechanically, before or during the polymerization of the layer 7. The ribs 9 are parallel and extend along an axis perpendicular to the cutting plane in FIG. 3.

The drag of an aircraft is generated by various conditions associated with the movements of air particles around said aircraft. The drag force must be compensated by an additional power consumption. A not very important reduction in the drag can significantly reduce the fuel consumption of an aircraft.

It is particularly interesting to reduce friction drag. This drag is connected with the speed differences between filaments of fluid flow near a solid surface. At the contact with said surface a boundary layer is formed, in which the flow of fluid is turbulent. These turbulences generate the force of friction drag.

It is known that the turbulences of the boundary layer decrease when the solid surface comprises micro-ribs, or riblets, parallel to the direction of flow. The linear shape of the ribs channels the fluid and makes the flow thereof near the surface easier. This phenomenon was already exploited for manufacturing a drag reducing film, as described in patent EP1578600.

According to a cutting plane perpendicular to their axis of extension, the ribs 9 can have a V- or sawtooth-shaped profile, as represented in FIG. 3. They can have other profiles, for example a U-shaped profile, i.e. the walls of a rib 9 are bent in a concave way. The ribs can also have a rectangular profile, i.e. they have a bottom parallel to the surface of the layer 8 and walls perpendicular to said surface. Many alternatives, known in the state of the art, are also possible.

According to the embodiment of the invention represented in FIG. 3, a thickness 11 of the layer 7 is preferentially comprised between 15 and 300 μM. the thickness 11 is measured in a zone where it is maximum by taking account of the sawtooth profile of the ribs 9. A height 12 of a rib 9 is preferentially comprised between 10 and 100 μM.

A method for forming a coating 10 such as represented in FIG. 3 can be as follows: first of all, the surface of the layer 8 for receiving the coating is prepared. If the layer 8 is a primary layer or a basic underlayer, the types of preparation described previously can be used. Then, a layer of a composition according to the invention, containing a photo-catalyst, is deposited onto the layer 8. The deposition can be carried out by means of a bar coater.

Then, ribs 9 are formed mechanically, by means of a tool with a shape adapted to the desired rib profile. In the example represented in FIG. 3, it can be a comb-shaped tool 20, with a sawtooth profile. While moving the tool, a UV lamp is moved above the layer 7 in order to solidify the ribs 9 in the shape given by said tool.

An alternative to this method comprises the following steps: preparing the surface of the layer 8, then depositing a layer of a composition according to the invention containing a photo-catalyst. The deposition is carried out by distributing the composition in an unequal way according to the zone of the surface 8 concerned, so as to form ribs 9. While depositing the composition, a UV lamp is moved above the layer 7 of a composition according to the invention.

The self-cleaning and anti-icing properties of the coating according to the invention are particularly advantageous for a surface comprising of raised micro-patterns such as ribs 9 described above. Indeed, the self-cleaning properties prevent the ribs from being filled up by water drops or dirt. In the same way, the anti-icing properties prevent the ribs from being covered with ice.

In addition, the good resistance to erosion of the compositions ensures the time persistence of the raised micro-patterns on the coating surface.

The compositions according to the invention have a strong viscosity at rest, as well as a shear-thinning behavior. These properties are in particular connected with interactions between oligomer chains and silica particles.

Such physical properties are favorable to the formation of ribs 9 as described above. Indeed, the formation of ribs 9 by a mechanical process led to apply to the composition layer a high shear stress. The composition has then a low viscosity, which makes its working easier. After the disappearance of the shear stress, the composition gets back to a high viscosity again. This viscosity enables the ribs 9 to keep their shape until their solidification by polymerization of the composition.

According to another embodiment of the invention, the coating 10 represented in FIG. 3 is intended to be applied, in the form of a solid film, onto the surface of an apparatus such as an aircraft. The layer 8 can then consist of an adhesive material, intended to be brought in contact with said surface of an apparatus. Such adhesive materials are known in the state of the art and are in particular described in patent EP1578600.

The coating 10 can also comprise one or more intermediate layers between the surface layer 7 and the layer 8 of adhesive material.

Coatings comprising a surface layer and an adhesive layer can also be made with a flat surface layer, without any raised micro-patterns.

A method for forming such an adhesive film can comprise the previously-described steps of deposition, of possible formation of ribs 9 and of polymerization of a composition according to the invention, onto a layer 8 of adhesive material or on a intermediate layer to be placed between the layers 7 and 8.

Figures 4, 5:
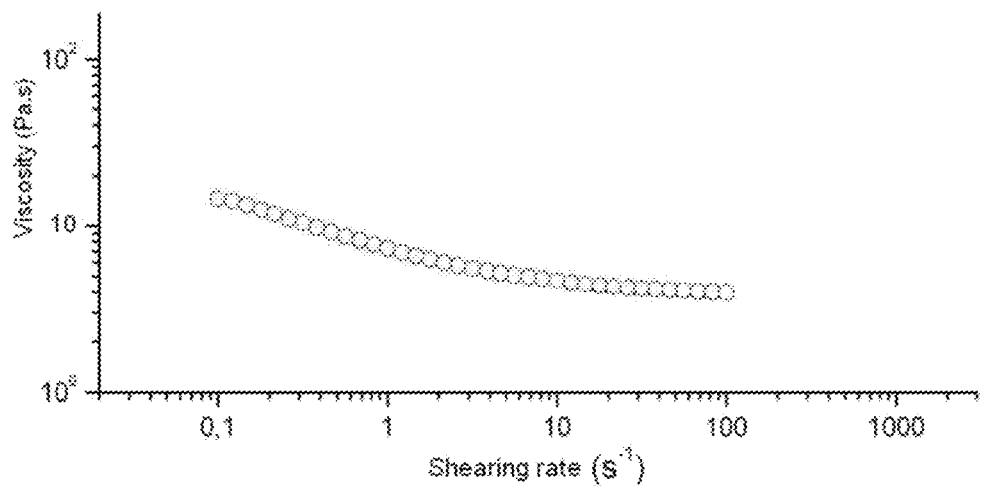
FIG. 4: a comparison table of measures on coatings according to various embodiments of the invention.
FIG. 5: a graphical representation of a variation of the viscosity of a composition according to an embodiment of the invention, according to the shearing forces applied.

FIG. 4 represents a comparison table of water contact angle measures for coatings obtained from various compositions according to the invention. These compositions correspond to particular embodiments of the invention:

Composition 1:
  70 mass % of aliphatic urethane-acrylate oligomer with an average molar mass in number equal to 4000 g·mol-1;
  24 mass % of tripropylene glycol diacrylate;
  5 mass % of 1-hydroxy-cyclohexyl-phenyl ketone;
  1% of hydrophobic pyrogenic silica with polydimethyl-siloxane function, with a percentage of residual hydroxyl functions equal to 25% and a specific surface equal to 120 $m^2 \cdot g^{-1}$;

This mixture is prepared by agitation (1500 rpm) for 30 minutes by means of a centrifugal spreader adapted to the viscosity of the medium. The formulation is then degassed for 60 minutes under a primary vacuum and slightly agitated mechanically (100 rpm).

Composition 2:
  61 mass % of aliphatic urethane-acrylate oligomer with an average molar mass in number equal to 1800 $g \cdot mol^{-1}$;
  33 mass % of 1,6-hexanediol diacrylate;
  5 mass % of 1-hydroxy-cyclohexyl-phenyl ketone;
  1% of hydrophobic pyrogenic silica with a polydimethyl-siloxane function, with a percentage of residual hydroxyl functions equal to 25% and a specific surface equal to 120 $m^2 \cdot g^{-1}$;

This mixture is prepared by agitation (1500 rpm) for 30 minutes by means of a centrifugal spreader adapted to the viscosity of the medium. The formulation is then degassed for 60 minutes under a primary vacuum and slightly agitated mechanically (100 rpm).

Composition 3:
  60 mass % of aliphatic urethane-acrylate oligomer with an average molar mass in number equal to 1800 $g \cdot mol^{-1}$;
  32 mass % of 1,6-hexanediol diacrylate;
  5 mass % of 1-hydroxy-cyclohexyl-phenyl ketone;
  1% of hydrophobic pyrogenic silica with a polydimethyl-siloxane function, with a percentage of residual hydroxyl functions equal to 25% and a specific surface equal to 120 $m^2 \cdot g^{-1}$;
  2% of 1H, 1H, 2H, 2H-perfluorodecyl acrylate.

This mixture is prepared by agitation (1500 rpm) for 30 minutes by means of a centrifugal spreader adapted to the viscosity of the medium. The formulation is then degassed for 60 minutes under a primary vacuum and slightly agitated mechanically (100 rpm).

Composition 4:
- 60 mass % of aliphatic urethane-acrylate oligomer with an average molar mass in number equal to 1800 g·mol$^{-1}$;
- 32 mass % of 1,6-hexanediol diacrylate;
- 5 mass % of 1-hydroxy-cyclohexyl-phenyl ketone;
- 1% hydrophobic pyrogenic silica with a polydimethylsiloxane function, with a percentage of residual hydroxyl functions equal to 25% and a specific surface equal to 120 m$^2$·g$^{-1}$;
- 2% of 2,2,3,4,4,4-hexafluorobutyl acrylate.

This mixture is prepared by agitation (1500 rpm) for 30 minutes by means of a centrifugal spreader adapted to the viscosity of the medium. The formulation is then degassed for 60 minutes under a primary vacuum and slightly agitated mechanically (100 rpm).

Each composition previously described is applied onto an aluminum plate (alloy A2024T3, plated) of 80×125×1.6 mm covered with a polyurethane film, by means of a bar coater, after mechanical activation of the surface and cleaning by means of an organic solvent such as diestone. The coated substrate is then polymerized by means of an average pressure mercury vapor lamp, with a two-pass transfer. A first pass is carried out at the speed of 9 m/min and a second pass at 3 m/min which represents an UV total amount equal to 441 mJ/m$^2$. The coating after polymerization has an average thickness of 60 μm.

Water contact angle measures are obtained by means of a Digidrop apparatus from GXB Scientific Instruments. Ten measures are obtained for each coating and an average value is calculated.

The average values obtained for the coatings with the compositions 1 to 4 can be seen in the table represented in FIG. 4. The higher the contact angle is, the more hydrophobic the surface is.

The coatings have a water contact angle between 70° and 80°, which corresponds to a good hydrophobicity of the formed surfaces. An angle comparison for the compositions 2, 3 and 4 shows that the addition of a fluorinated compound, particularly 1H,1H,2H,2H-perfluorodecyl acrylate, increases the hydrophobicity of the coating surface.

FIG. 5 is a graphic representation showing the viscosity variation for the composition 2 according to the shearing rate applied. Measures were obtained by means of a rheometer MCR 301 (Anton Paar).

It is noted that viscosity decreases as the shearing rate increases, which is characteristic of a shear-thinner behavior. This reduction in viscosity is Probably connected with shearing rupture due to the interactions between silica and oligomer chains. As a network structure is destroyed, the apparent viscosity of the composition is lower than that at rest. When shearing is stopped, it should be noted that said network structure is quickly restored. During the formation of ribs by the action of a tool with an adapted shape, the ribs keep their shape for an enough long time so as to be solidified by polymerization.

The invention claimed is:

1. A method for coating a substrate surface, comprising the steps of:
   applying directly onto an aircraft's substrate surface, a layer comprising a composition of:
      a mass percentage of urethane-acrylate oligomer, with an average molar mass in number between 1000 and 5000 gmol$^{-1}$, from 60% to 70%;
      a mass percentage of a diluting agent, copolymerizable with the urethane-acrylate oligomer, from 15% to 33%;
      a mass percentage of pyrogenic silica that has been treated for increasing the hydrophobicity of its surface, between 0.5% and 5%;
      a polymerization photo-catalyst;
   said layer having a thickness between 15 and 300 pm;
   mechanically pressing a non-roller type, comb-shaped tool onto said layer on the aircraft's surface and moving said comb-shaped tool along said layer on the aircraft's surface to form parallel ribs having a sawtooth-shaped profile thereon, said parallel ribs having heights from 10 to 100 pm; and
   polymerizing said layer with ultraviolet radiation from a UV source located above said layer simultaneously with the step of mechanically pressing and moving said comb-shaped tool to solidify said parallel ribs having said sawtooth-shaped profile on said layer.

2. The method of claim 1, wherein the treated pyrogenic silica comprises a polydimethylsiloxy- or dimethylsiloxy-group, and the treated pyrogenic silica has a percentage of residual hydroxyl groups lower than or equal to 50% of an amount of hydroxyl groups present in the pyrogenic silica before treatment for increasing the hydrophobicity.

3. The method of claim 1, wherein the pyrogenic silica before treatment for increasing the hydrophobicity has a specific surface area between 80 and 200 m$^2$g$^{-1}$.

4. The method of claim 1, wherein the composition has a mass percentage of at least one fluorinated compound, copolymerizable with the urethane-acrylate oligomer, between 0.5% and 5%.

5. The method of claim 4, wherein the fluorinated compound is a hydrofluorocarbon, linear or branched, with an acrylate or methacrylate group.

6. The method of claim 1, wherein the composition further comprises a polyhedral oligomeric silsesquioxane copolymerizable with the urethane-acrylate oligomer.

7. The method of claim 6, wherein the polyhedral oligomeric silsesquioxane copolymerizable with the urethane-acrylate oligomer comprises at least one fluorinated group.

8. The method of claim 1, wherein the diluting agent, copolymerizable with the urethane-acrylate oligomer, is tripropylene glycol diacrylate or 1,6-hexanediol diacrylate.

9. The method of claim 1, wherein the treated pyrogenic silica comprises a polydimethylsiloxy- or dimethylsiloxy-group, and the treated pyrogenic silica has a percentage of residual hydroxyl groups lower than or equal to 25% of an amount of hydroxyl groups present in the pyrogenic silica before treatment for increasing the hydrophobicity.

\* \* \* \* \*